United States Patent
Chhorng et al.

(10) Patent No.: US 11,901,543 B2
(45) Date of Patent: *Feb. 13, 2024

(54) LOWER PYROLYSIS TEMPERATURE BINDER FOR SILICON-DOMINANT ANODES

(71) Applicant: Enevate Corporation, Irvine, CA (US)

(72) Inventors: Monika Chhorng, Irvine, CA (US); David J. Lee, Irvine, CA (US); Rahul Kamath, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,790

(22) Filed: Sep. 15, 2022

(65) Prior Publication Data
US 2023/0187604 A1    Jun. 15, 2023

Related U.S. Application Data

(63) Continuation of application No. 16/681,401, filed on Nov. 12, 2019, now Pat. No. 11,450,841.

(51) Int. Cl.
*H01M 4/04* (2006.01)
*H01M 4/134* (2010.01)
*H01M 4/62* (2006.01)
*H01M 4/1395* (2010.01)
(Continued)

(52) U.S. Cl.
CPC ....... *H01M 4/0471* (2013.01); *H01M 4/0404* (2013.01); *H01M 4/134* (2013.01); *H01M 4/1395* (2013.01); *H01M 4/386* (2013.01); *H01M 4/621* (2013.01); *H01M 4/625* (2013.01); *H01M 2004/027* (2013.01)

(58) Field of Classification Search
CPC .. H01M 4/0471; H01M 4/0404; H01M 4/134; H01M 4/1395; H01M 4/386; H01M 4/621; H01M 4/625
See application file for complete search history.

(56) References Cited

U.S. PATENT DOCUMENTS

| | | |
|---|---|---|
| 6,413,672 B1 | 7/2002 | Suzuki et al. |
| 2001/0016281 A1 | 8/2001 | Ito |
| 2009/0111031 A1 | 4/2009 | Hirose et al. |

(Continued)

OTHER PUBLICATIONS

Int'l Search Report and Written Opinion Appln No. PCT/US2020/058274 dated Dec. 16, 2020.

(Continued)

*Primary Examiner* — Golam Mowla
(74) *Attorney, Agent, or Firm* — McAndrews, Held & Malloy, Ltd.

(57) ABSTRACT

Systems and methods are provided for carbon additives for direct coating of silicon-dominant anodes. An example composition for use in directly coated anodes may include a silicon-dominated anode active material, a carbon-based binder, and a carbon-based additive, with the composition being configured for low-temperature pyrolysis. The low-temperature pyrolysis may be conducted at <600° C. An anode may be formed using a direct coating process of the composition on a current collector. The anode active material yields silicon constituting between 86% and 97% of weight of the formed anode after pyrolysis. The carbon-based additive yields carbon constituting between 2% and 6% of weight of the formed anode after pyrolysis.

19 Claims, 9 Drawing Sheets

(51) Int. Cl.
*H01M 4/02* (2006.01)
*H01M 4/38* (2006.01)

(56) References Cited

U.S. PATENT DOCUMENTS

2009/0325072 A1   12/2009   Maeda et al.
2012/0009483 A1    1/2012   Chu et al.
2012/0088150 A1    4/2012   Hwang

OTHER PUBLICATIONS

"Polyamideimide Properties" as provided by "Polymer Properties Database", accessed from https://polymerdatabase.com/polymer%20classes/Polyamideimide%20type.html, accessed on Jul. 13, 2020.

ize Carbonate (EC),
Fluoroethylene Carbonate (FEC), Propylene Carbonate
(PC), Dimethyl Carbonate (DMC), Ethyl Methyl Carbonate
(EMC), Diethyl Carbonate (DEC), etc. with dissolved
LOWER PYROLYSIS TEMPERATURE BINDER FOR SILICON-DOMINANT ANODES

CROSS-REFERENCE TO RELATED APPLICATIONS

This application is a continuation of U.S. application Ser. No. 16/681,401, filed Nov. 12, 2019, the entirety of which is hereby incorporated by reference.

FIELD

Aspects of the present disclosure relate to energy generation and storage. More specifically, certain embodiments of the disclosure relate to a method and system for a binder with a lower pyrolysis temperature. Such a binder may be used in a battery with a silicon-dominant anode.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method are provided for a binder with a lower pyrolysis temperature, where such a binder is used in a battery with a silicon-dominant anode, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
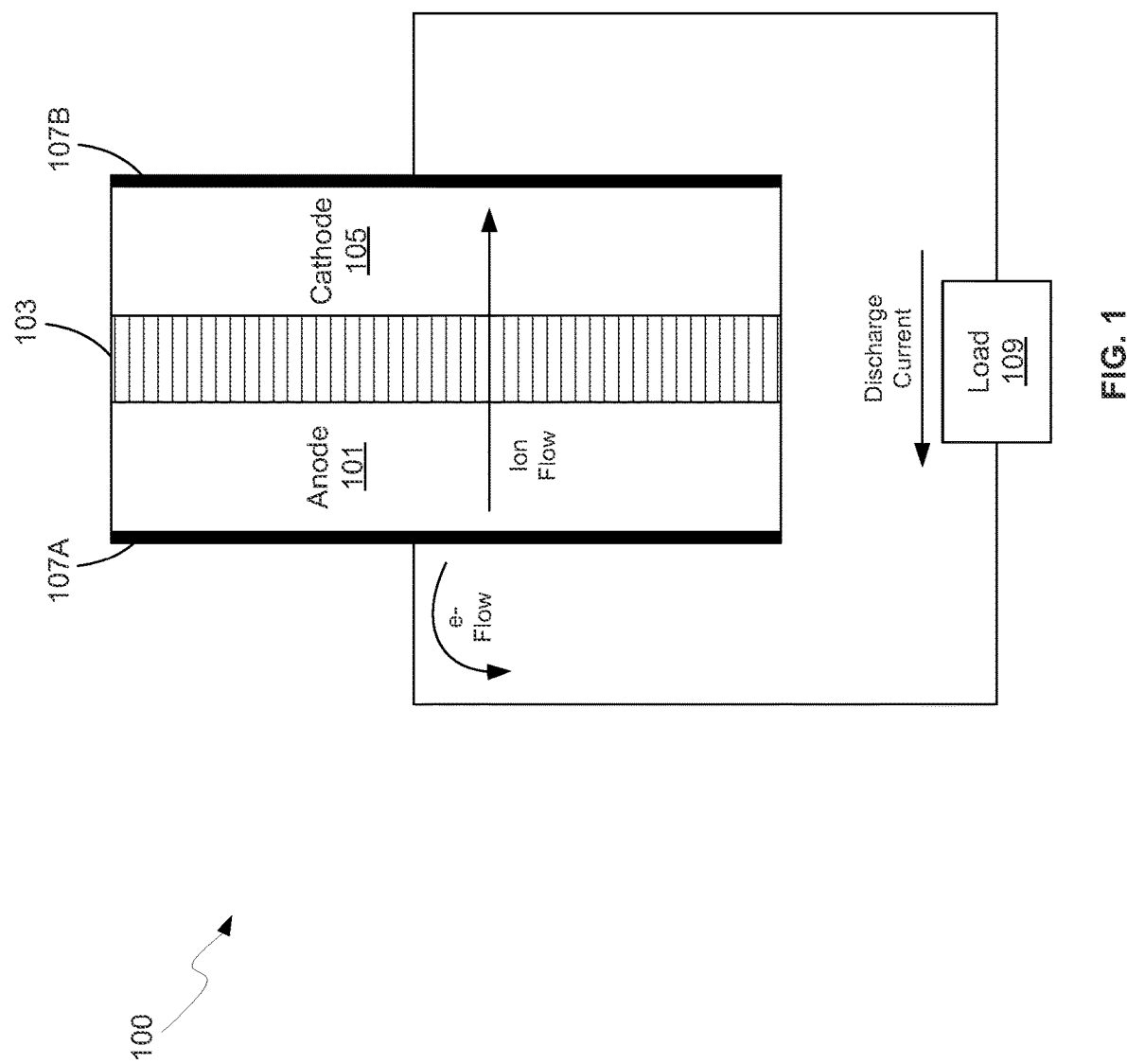
FIG. 1 is a diagram of a battery with anode expansion configured via silicon particle size, in accordance with an example embodiment of the disclosure.

FIG. 1 is a diagram of a battery with a silicon-dominant anode that experiences anode expansion, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved LiBF$_4$, LiAsF$_6$, LiPF$_6$, and LiClO$_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Figure 2:
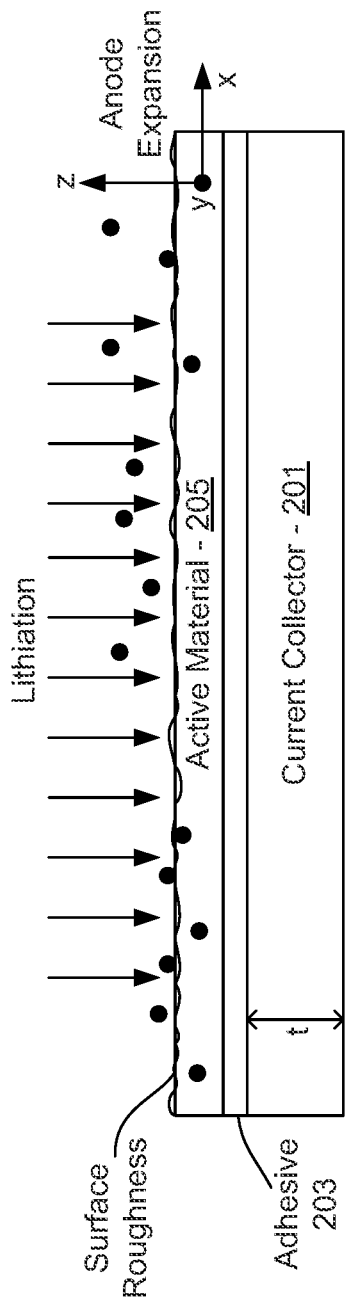
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 μm, such as 10 μm or 20 μm for copper, for example, while thinner foils may be less than 6 μm thick in copper.

In another example scenario, when the current collector 201 is thinner, on the order of 5-6 μm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

Figure 3A:
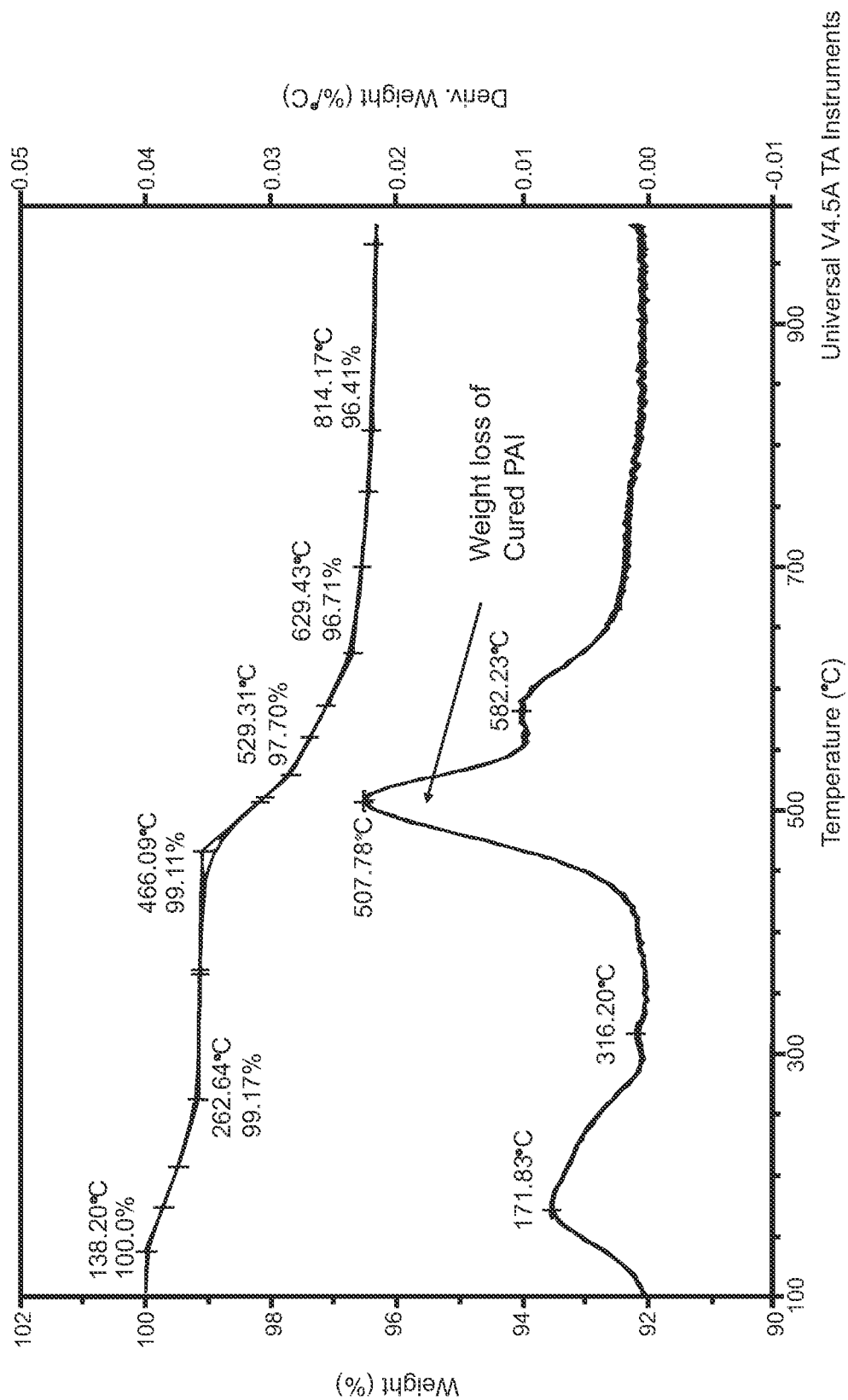
FIG. 3A illustrates the thermalgravimetric analysis (TGA) of a cured anode comprising PAI, in accordance with an example embodiment of the disclosure.

FIG. 3A illustrates the thermalgravimetric analysis (TGA) of a cured anode comprising PAI, in accordance with an example embodiment of the disclosure. TGA is a method of thermal analysis in which the mass of a sample is measured over time as the temperature changes. As illustrated, the carbonization of this cured anode occurs below 600° C. PAI exhibits a multi-stage mass loss pattern, presumably due to the loss of solvent prior to the onset of pyrolysis. The first stage of mass loss exhibits an onset ~140° C., and results in ~1% mass loss. IR spectra from this outgassing are consistent with the spectra for N-methyl-2-pyrrolidone (NMP) (1783, 1414,1287 $cm^{-1}$), which is a solvent commonly used in the manufacture of PAI materials. Pyrolysis of the PAI material in this cured anode, with an onset of ~470° C., corresponds to a further mass loss of ~3%. The IR spectrum of the pyrolysis products at 500° C. shows a mixture of several species, including $CO_2$ (~2300, 669 $cm^{-1}$), and CO (~2100, 2200 $cm^{-1}$). In addition, likely products include imide compounds (based on the peaks in the 1727-1784 $cm^{-1}$ range), and various substituted aromatic rings (based on the peaks in the ~3050 $cm^{-1}$ range.) At 600° C., peaks associated with the presence of $NH_3$ (966, 930 $cm^{-1}$) can be observed.

Figure 3B:
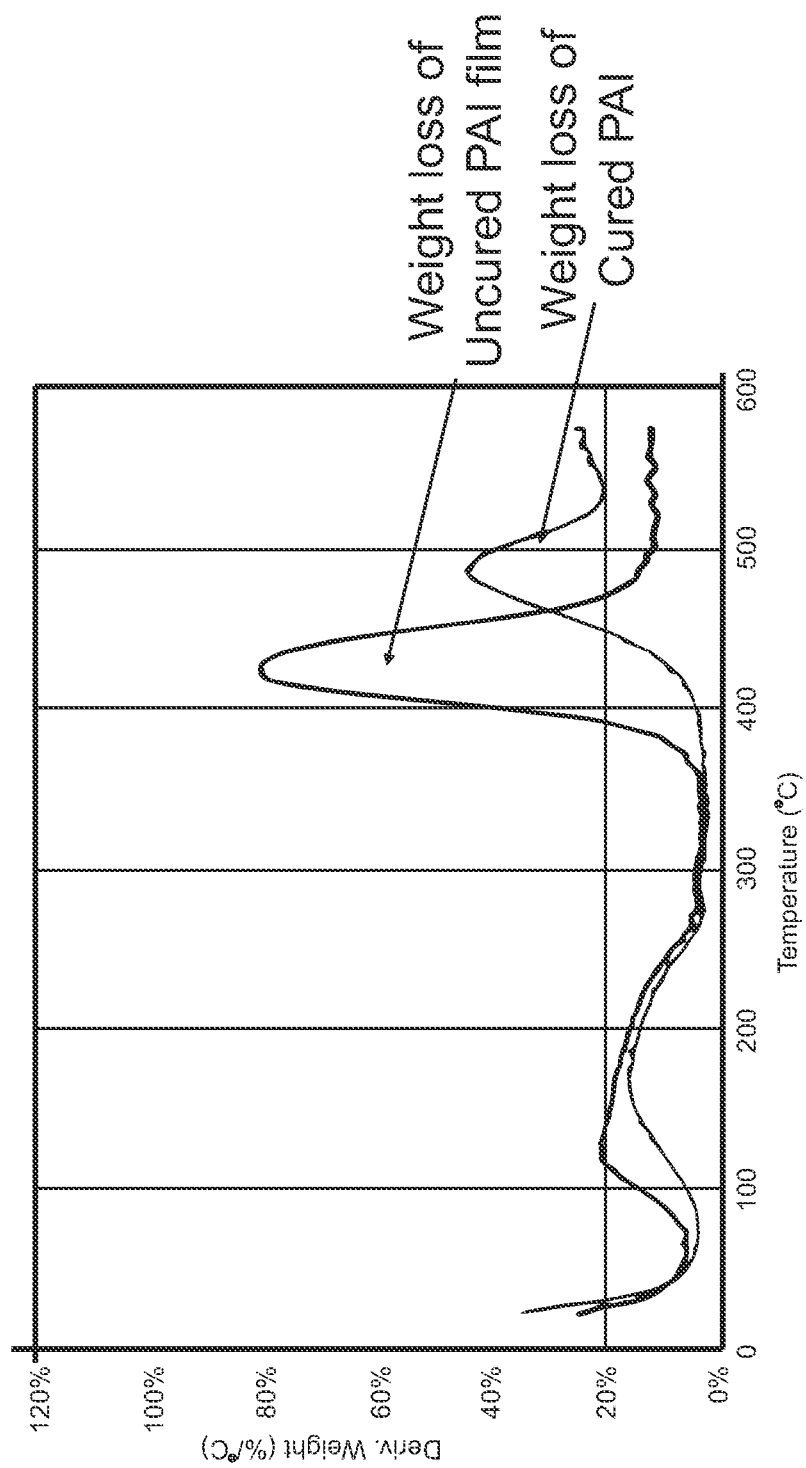
FIG. 3B illustrates a comparison between the TGA of uncured PAI and the TGA of cured PAI, in accordance with an example embodiment of the disclosure.

FIG. 3B illustrates a comparison between the TGA of uncured PAI film and the TGA of cured PAI, in accordance with an example embodiment of the disclosure. As illustrated the major derivative weight loss peak during pyrolysis of uncured PAI occurs at a lower temperature as compared to the major derivative weight loss peak during pyrolysis of cured PAI. The total weight loss of uncured PAI is also greater that the total weight loss of cured PAI.

Figure 3C:
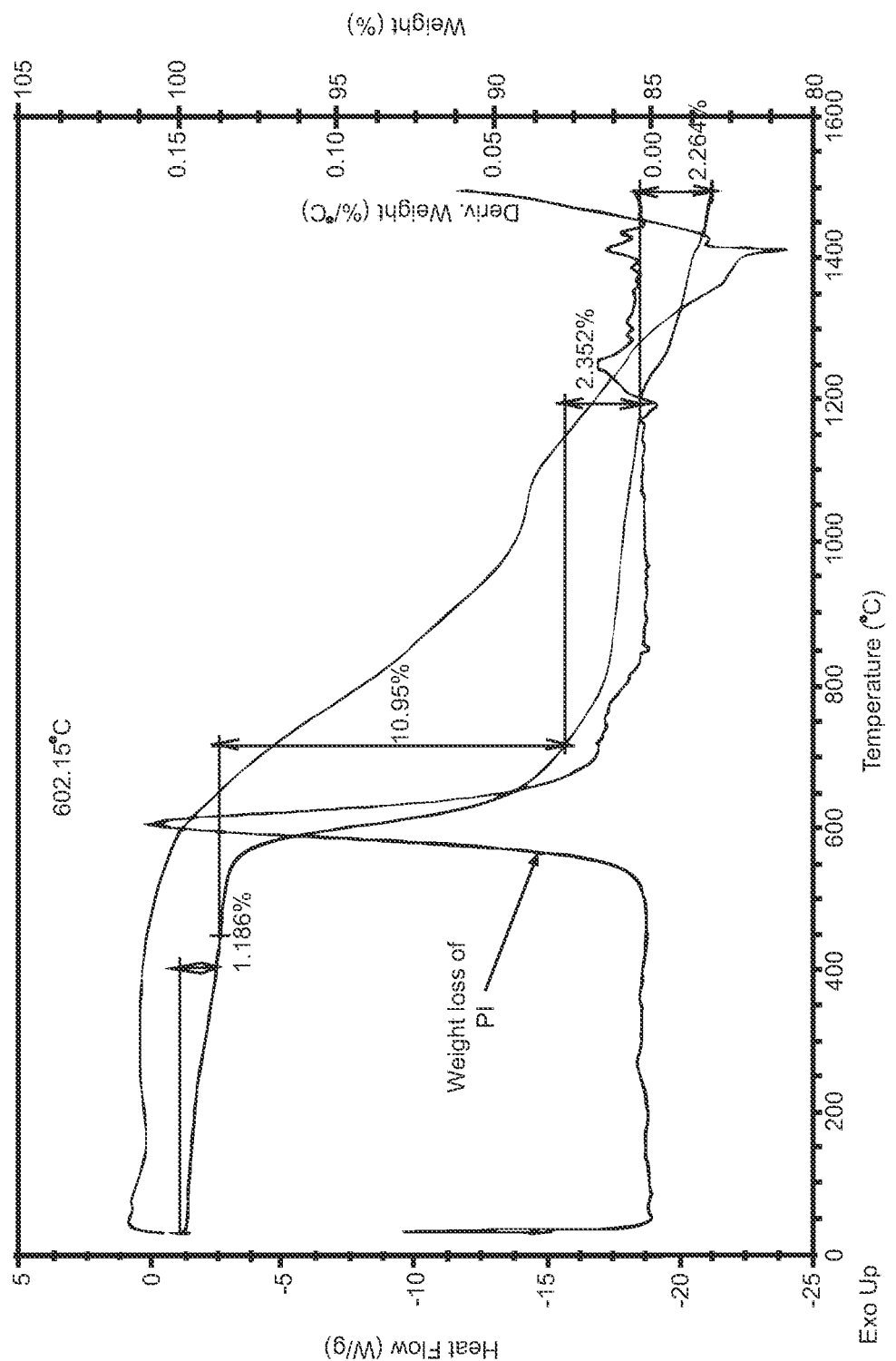
FIG. 3C illustrates the TGA of PI, in accordance with an example embodiment of the disclosure.

FIG. 3C illustrates TGA of PI, in accordance with an example embodiment of the disclosure. FIG. 3C illustrates that a weight loss change for PI occurs at 602° C., which is a higher temperatures than for PAI. Thus, PAI, particularly PAI film, is better suited for low-temperature pyrolysis.

Figure 4:
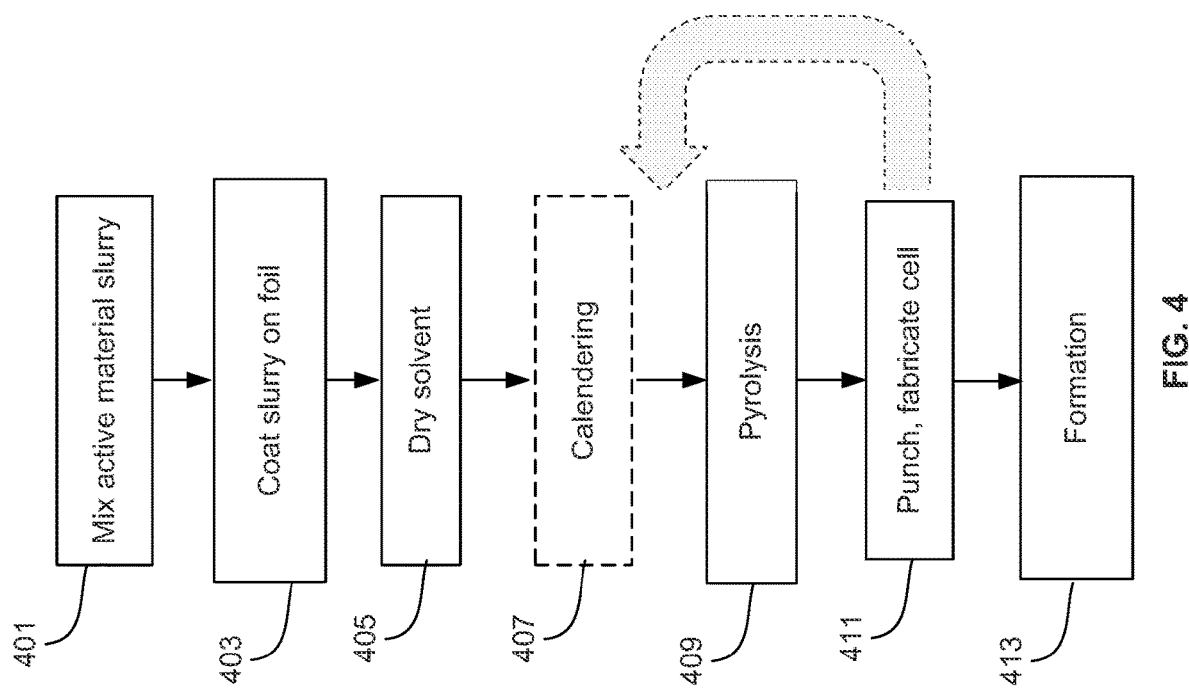
FIG. 4 is a flow diagram of a process for direct coating electrodes, in accordance with an example embodiment of the disclosure.

FIG. 4 is a flow diagram of a process for direct coating electrodes, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 5.

In step 401, the raw electrode active material may be mixed using a binder/resin (such as PI, PAI), solvent, and optionally a conductive carbon. For example, silicon powder with desired particle size may be dispersed into PI and PAI under high shear dispersion for 1 hour followed by the addition of conductive carbon (such as graphite, graphene, Super P, ECP, or a combination) and additional dispersion for, e.g. 1-2 hours. When high surface area carbon additive like super P and ECP are used, the mixture may be dispersed under sonication for, e.g. 30-60 minutes to increase the homogeneity. Alternative to sonication mixing, ball mill may also be used as a high energy mixing method. The mixture may then be diluted with a solvent such as N-Methyl-pyrrolidone (NMP) using high shear dispersion at, e.g., 1000 rpm to achieve a slurry viscosity within 2000-4000 cP and a total solids content above 30%. Depends on the materials, mixing method, speed, and duration may be varied to achieve a homogenous mixture. The particle size of the silicon powder and carbon additive may be varied to configure the active material density and/or roughness.

In step 403, the slurry may be coated on the foil at a loading of, e.g., 3-4 mg/$cm^2$, which may undergo drying in step 405 resulting in less than 15% residual solvent content. In step 407, an optional calendering process may be utilized where a series of hard pressure rollers may be used to finish the film/substrate into a smoother and denser sheet of material.

In step 409, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis 409 can be done either before or after punching 411. If the punching 411 is done after the pyrolysis process 409, the pyrolysis may be performed in a roll form. The pyrolyzed and punched electrode may be sandwiched with a separator and a cathode and an electrolyte may be added to form a cell. In step 413, the cell may be subjected to a formation process, comprising initial charge and discharge steps to lithiate the anode, with some residual lithium remaining.

Figure 5:
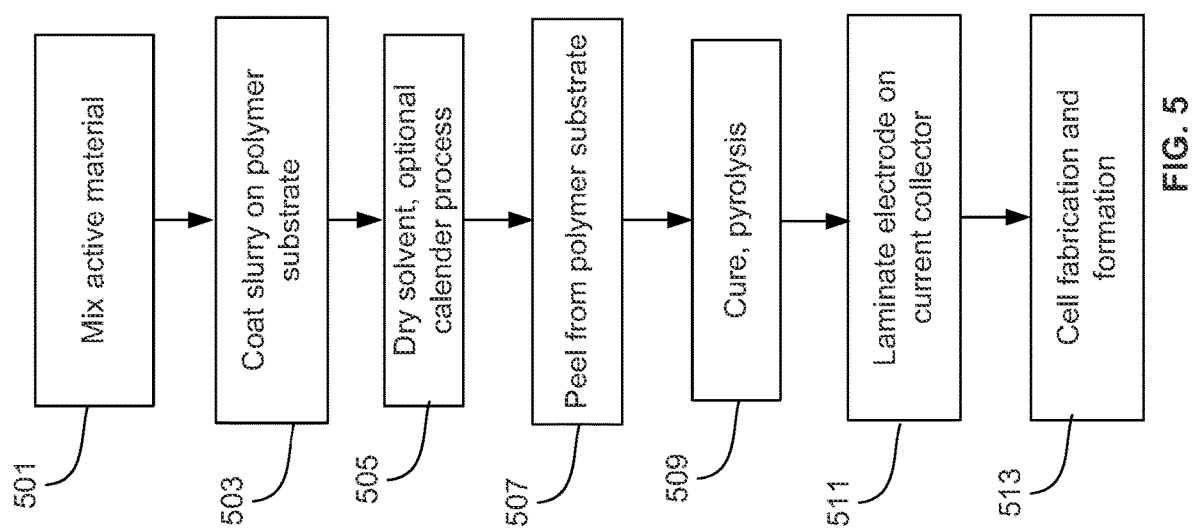
FIG. 5 is a flow diagram of an alternative process for transfer lamination of electrodes, in accordance with an example embodiment of the disclosure.

FIG. 5 is a flow diagram of an alternative process for transfer lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 5, starting with step 501 where the active material may be mixed with a binder/resin such as polyimide (PI) or polyamide-imide (PAI), and a solvent. Optional additives include silosilazane, conductive carbon and/or a surface modification additive (e.g., surfactant, silane, and silosilazane). Similar to the process described in FIG. 4, silicon powder may be dispersed directly into a binder such as PI or PAI under high shear dispersion for 1 hour followed by the addition of optional conductive carbon and/or other additives. When high surface area carbon additives like Super P and ECP are used, the mixture may be dispersed under sonication for, e.g. 30-60 minutes to increase the homogeneity. Alternative to sonication, ball mill mixing may also be used as a high energy mixing method. The mixture may then be diluted with a solvent such as N-Methyl-pyrrolidone (NMP) using high shear dispersion at, e.g. 500-2000 rpm to achieve a slurry viscosity within 2000-4000 cP and a total solids content at around 20-40%. In dependent of the materials used, order of addition, mixing method, speed, and duration may be varied to achieve a homogenous mixture. The particle size may be varied to configure the active material density and/or roughness.

In step 503, the slurry may be coated on a polymer substrate, such as polyethylene terephthalate (PET, e.g., Mylar) or polypropylene (PP). The slurry may be coated on the PET/PP/Mylar film at a loading of 3-4 mg/cm$^2$ (with 13-20% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 12-16 hours, 200-240° C. for 4 to 6 hours). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 511, the pyrolyzed material may be flat press or roll press laminated on the current collector, where a copper foil may be coated with polyamide-imide with a nominal loading of 0.35-0.75 mg/cm$^2$ with 15-20% residual solvent (applied as a 5-7 wt % varnish in NMP, dried 10-20 hours at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 513, the electrode may then be sandwiched with a separator and cathode with electrolyte to form a cell. The cell may be subjected to a formation process, comprising initial charge and discharge steps to lithiate the anode, with some residual lithium remaining. The expansion of the anode may be measured to confirm reduced expansion and anisotropic nature of the expansion. The larger silicon particle size results in a rougher surface, higher porosity and less dense material, which reduces the expansion of the active material during lithiation.

PI (polyimide) may be used for direct coating onto copper. However, the performance of PI suffers after pyrolysis. The performance may suffer, for example, due to having a higher carbonization temperature and pyrolysis temperature limitations. While an increase of Si can improve PI performance, the use of PAI (Polyamide-imide) results in a better precursor of pyrolyzed carbon than PI. Since PAI carbonizes faster and at a lower temperature than PI, PAI is better suited for the low temperature process of direct coating. At higher temperatures, there is a risk of NixSi or CuxSi formation that may destroy the current collector.

Figure 6:
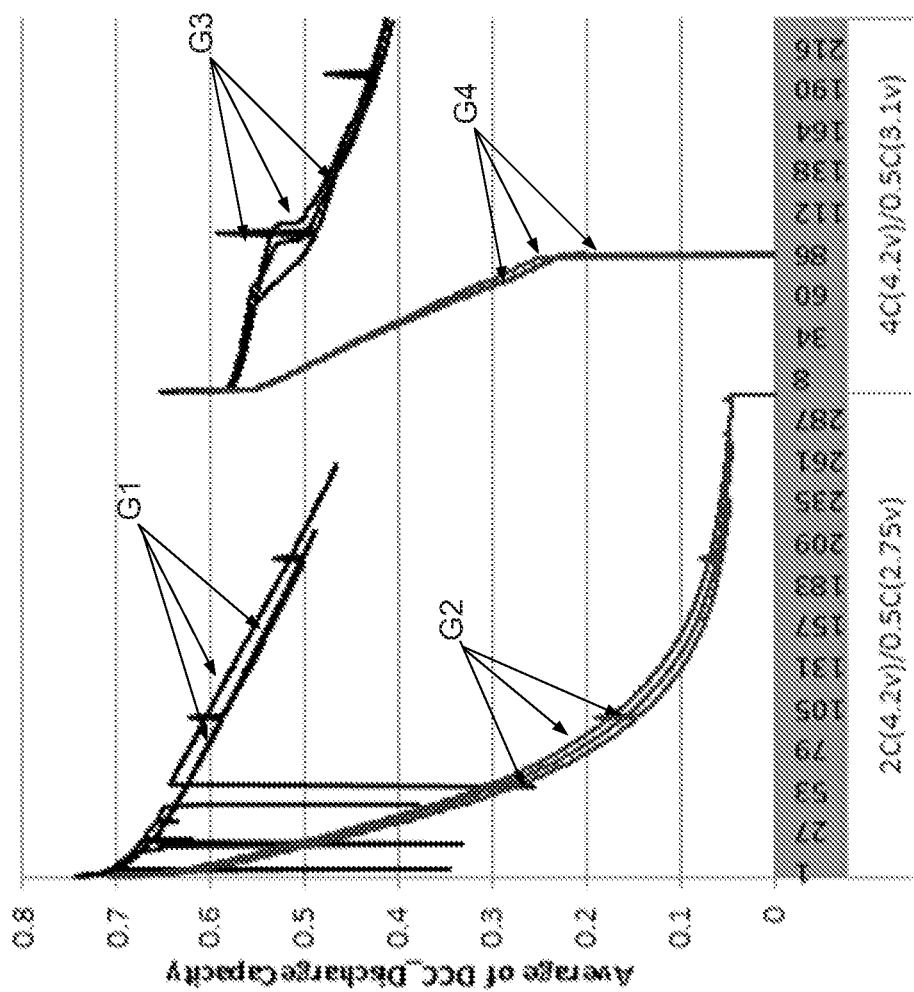
FIG. 6 is a plot illustrating discharge capacity performance for anode slurry formulations with 92% silicon and binders comprising either PAI (Polyamide imide) or PI (polyimide), in accordance with an example embodiment of the disclosure.

FIG. 6 is a plot illustrating discharge capacity performance for anode slurry formulations with 92% silicon and a binder comprising either PAI (Polyamide imide) or PI (polyimide), in accordance with an example embodiment of the disclosure. To compare PAI to PI as a binder for direct coating, cycle performance of these two polymers in formulations of different silicon and binder content is performed. A pyrolysis temperature of 550° C. maintains the integrity of copper foil as a current collector.

G1 in FIG. 6 illustrates discharge capacity of anodes with pyrolyzed PAI as binder at a 550° C. pyrolysis temperature and 30 dwell time under charging at a 2C rate to 4.2V and discharging at a 0.5 C rate to 2.7V test conditions. G2 in FIG. 6 illustrates discharge capacity of anodes with pyrolyzed PI at a 550° C. pyrolysis temperature and 30 dwell time under 2 C(4.2V)/0.5 C(2.7V). G3 in FIG. 6 illustrates discharge capacity of anodes with pyrolyzed PAI at a 550° C. pyrolysis temperature and 30 dwell time under 4 C(4.2V)/0.5 C(3.1V) test conditions. G4 in FIG. 6 illustrates discharge capacity of anodes with pyrolyzed PI at a 550° C. pyrolysis temperature and 30 dwell time under 4 C(4.2V)/0.5 C(3.1V) test conditions. As shown, the PAI group (G1 and G3) has a higher initial capacity and better capacity retention than PI resin (G2 and G4) in 92% Silicon, 4% Super P, and 4% hard carbon from the binder formulation.

Figure 7:
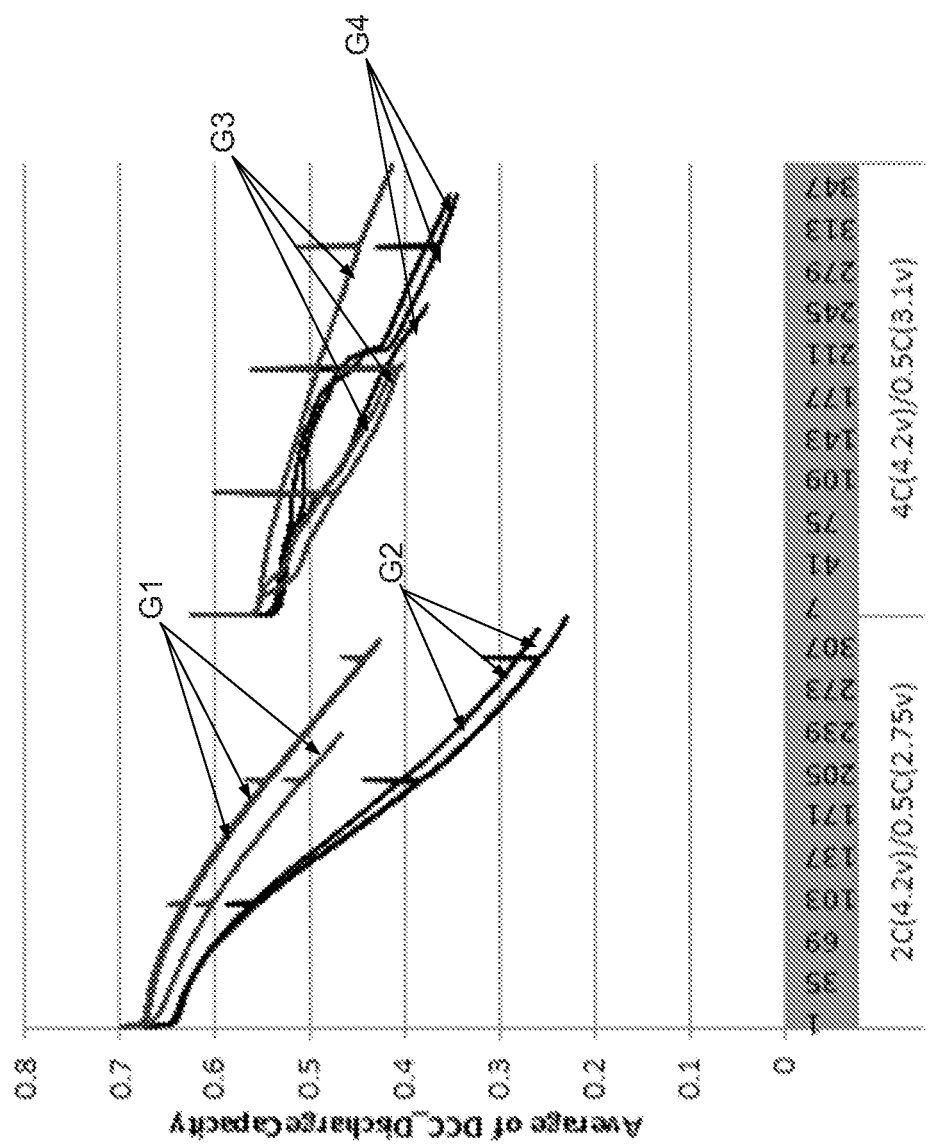
FIG. 7 is a plot illustrating discharge capacity performance for anode slurry formulations with 86% silicon and binders comprising either PAI (Polyamide imide) or PI (polyimide), in accordance with an example embodiment of the disclosure.

FIG. 7 is a plot illustrating discharge capacity performance for anode slurry formulations with 86% silicon and a binder comprising either PAI (Polyamide imide) or PI (polyimide), in accordance with an example embodiment of the disclosure.

G1 in FIG. 7 illustrates PAI discharge capacity at a 550° C. pyrolysis temperature and 30 dwell time under 2 C(4.2V)/0.5 C(2.7V) test conditions. G2 in FIG. 7 illustrates PI discharge capacity at a 550° C. pyrolysis temperature and 30 dwell time under 2 C(4.2V)/0.5 C(2.7V). G3 in FIG. 7 illustrates PAI discharge capacity at a 550° C. pyrolysis temperature and 30 dwell time under 4 C(4.2V)/0.5 C(3.1V) test conditions. G4 in FIG. 7 illustrates PI discharge capacity at a 550° C. pyrolysis temperature and 30 dwell time under 4 C(4.2V)/0.5 C(3.1V) test conditions. As shown the PAI group (G1 and G3) has a higher initial capacity and better capacity retention than PI resin (G2 and G4) in an 86% silicon slurry composition.

An example composition for use in directly coated anodes, in accordance with the present disclosure, comprises a silicon-dominated anode active material, a carbon-based binder, and a carbon-based additive, with the composition being configured for low-temperature pyrolysis. The onset of the pyrolysis may occur below 500° C. Carbonization may occur below 600° C.

An example method, in accordance with the present disclosure, comprises mixing a composition for use in directly coated anodes, with the composition comprising: a silicon-dominated anode active material, a carbon-based binder, and a carbon-based additive. The composition is configured for low-temperature pyrolysis, which may be conducted at <600° C. An anode may be formed using a direct coating process of the composition on a current collector.

In an example implementation, the anode active material yields silicon constituting up to 92% of weight of a formed anode after pyrolysis.

In an example implementation, the anode active material yields silicon constituting at least 86% of weight of a formed anode after pyrolysis.

In an example implementation, the carbon-based binder yields carbon constituting between 4% and 5% of weight of a formed anode after pyrolysis.

In an example implementation, the carbon-based additive yields carbon constituting between 2% and 6% of weight of a formed anode after pyrolysis.

In an example implementation, the carbon-based additive comprises at least one of ECP, ECP600, Super-P, and SLP.

In an example implementation, the carbon-based additive comprises carbon particles with surface area >800 m$^2$/g.

In an example implementation, the anode active material comprises polyamide-imide (PAI).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An anode, the anode comprising:
   a current collector; and
   an active material layer on the current collector, the active material layer comprising:
      a plurality of silicon particles providing the anode with a silicon content of greater than 95% and up to 97% by weight of the anode; and
      a pyrolytic carbon structure around the plurality of silicon particles of the active material layer, wherein the pyrolytic carbon structure comprises between 2% and 6% by weight of the anode.

2. The anode of claim 1, wherein the pyrolytic carbon structure comprises between 4% and 5% by weight of the anode.

3. The anode of claim 1, wherein the pyrolytic carbon structure comprises between 2% and 6% by weight of the anode after pyrolysis below 600° C.

4. The anode of claim 1, wherein the pyrolytic carbon structure comprises between 4% and 5% by weight of the anode after pyrolysis below 600° C.

5. The anode of claim 1, wherein the pyrolytic carbon structure comprises a glassy carbon.

6. The anode of claim 1, wherein the pyrolytic carbon structure comprises a glassy carbon from pyrolysis of polyamide-imide (PAI).

7. The anode of claim 6, wherein an onset of pyrolysis of the PAI occurs below 500° C.

8. The anode of claim 1, comprising an adhesive layer between the active material layer and the current collector.

9. The anode of claim 1, wherein:
   the current collector comprises copper; and
   an interface between the current collector and the active material layer lacks a formation of Cu×Si material.

10. The anode of claim 1, wherein:
    the current collector comprises nickel; and
    an interface between the current collector and the active material layer lacks a formation of Ni×Si material.

11. An anode, the anode comprising:
    a current collector; and
    an active material layer on the current collector, the active material layer comprising:
       a plurality of silicon particles providing the anode with a silicon content of at least 86% by weight of the anode; and
       a carbon structure around the plurality of silicon particles of the active material layer, wherein the carbon structure comprises between 2% and 6% by weight of the anode.

12. The anode of claim 11, wherein the carbon structure comprises between 4% and 5% by weight of the anode.

13. The anode of claim 11, wherein the carbon structure comprises between 4% and 5% by weight of the anode after pyrolysis below 600° C.

14. The anode of claim 11, wherein:
    the active material layer comprises an additive; and
    the additive comprises at least one of ECP, ECP600, Super-P, and SLP.

15. A battery, comprising:
    an anode;
    a cathode; and a separator between the anode and the cathode, wherein the anode comprises a current collector and an active material layer on the current collector;

wherein the active material layer comprises a silicon content of greater than 94% and up to 97% by weight of the anode;

wherein the active material layer comprises a carbon structure; and wherein the carbon structure comprises between 4% and 5% of weight of the anode.

16. The battery of claim 15, wherein the carbon structure comprises glassy carbon from pyrolytic decomposition of polyamide-imide (PAI) below 600° C.

17. The battery of claim 15, wherein the carbon structure comprises glassy carbon from pyrolytic decomposition of a binder below 600° C.

18. The battery of claim 15, wherein:

the current collector comprises copper; and an interface between the current collector and the active material layer lacks a formation of Cu$_x$Si material.

19. The battery of claim 15, wherein:

the current collector comprises nickel; and an interface between the current collector and the active material layer lacks a formation of Ni$_x$Si material.

* * * * *